United States Patent [19]
Skaife

[11] 3,961,444
[45] June 8, 1976

[54] FLOWER POT CONTAINER FOR PLANT SEEDS IN A DORMANT GROWING MEDIUM AND METHOD OF PREPARING FOR STORAGE AND SHIPMENT AND THEN USING SAME

[75] Inventor: William Skaife, Potosi, Wis.

[73] Assignee: Springtime Flowers, Inc., Dubuque, Iowa

[22] Filed: May 15, 1975

[21] Appl. No.: 577,863

Related U.S. Application Data

[63] Continuation-in-part of Ser. No. 503,803, Sept. 6, 1974.

[52] U.S. Cl.............. 47/34.11; 47/34 S; 47/37; 229/3.5 MF; 220/8
[51] Int. Cl.² .............. A01G 9/02; B65D 7/24
[58] Field of Search ............ 229/3.5 MF, DIG. 3; 220/8; 206/218; 47/34, 37, 56, 34.11

[56] References Cited
UNITED STATES PATENTS

| 879,753 | 2/1908 | Eckert | 220/8 |
|---|---|---|---|
| 2,323,379 | 7/1943 | Colpron | 47/34 X |
| 2,785,969 | 3/1957 | Clawson | 47/34 X |
| 2,893,167 | 7/1959 | Davidson | 47/37 |
| 2,893,168 | 7/1959 | Kobs | 47/37 |
| 3,140,034 | 7/1964 | Wyman et al. | 229/3.5 MF |
| 3,362,106 | 1/1968 | Goldring | 47/56 |
| 3,375,607 | 4/1968 | Melvold | 47/37 |
| 3,524,279 | 8/1970 | Adams | 47/34.13 |
| 3,748,783 | 7/1973 | Sokolies | 47/58 |
| 3,883,989 | 5/1975 | Melvold | 47/37 |

FOREIGN PATENTS OR APPLICATIONS

| 1,308,164 | 9/1962 | France | 47/34.11 |

Primary Examiner—Robert E. Bagwill
Attorney, Agent, or Firm—Zarley, McKee, Thomte & Voorhees

[57] ABSTRACT

Compressed peat moss is placed in a container and a seed tape is provided on top of the peat moss or individual seeds may be secured thereto by a layer of water soluble wax. The container may be sufficiently large enough to allow expansion of the peat moss when moisture is applied in preparation for use or the container may be comprised of telescopically interconnected sections which expand as the peat moss expands or tin foil capable of expanding with the peat moss. The application of water dissolves the wax and washes it away leaving the seeds to grow in the activated peat moss. The unused portion of the container above the compressed peat moss may be filled with edible foods such as candy or cheese which are removed prior to applying the water to the peat moss. A terrarium transparent dome may cover the container containing the peat moss seeds and edible food products. A tray for the food products on the peat moss may be removed and used as a watering tray.

12 Claims, 15 Drawing Figures

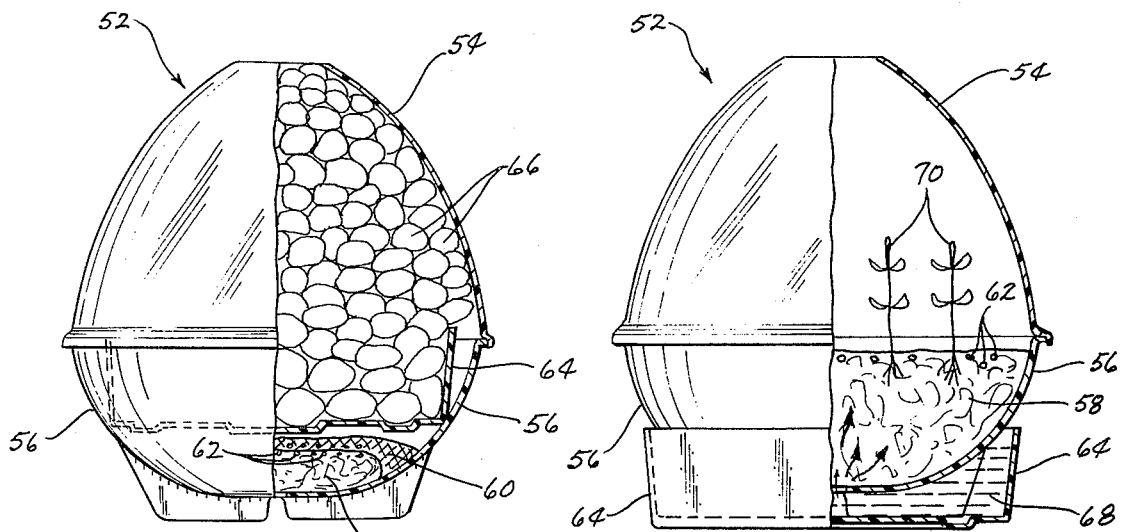
Fig. 9  Fig. 10
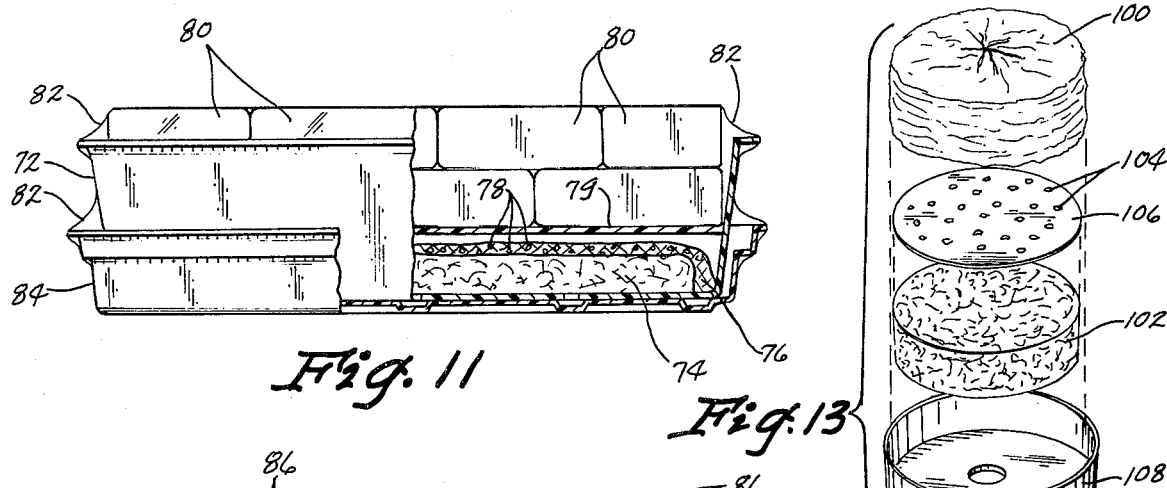
Fig. 11
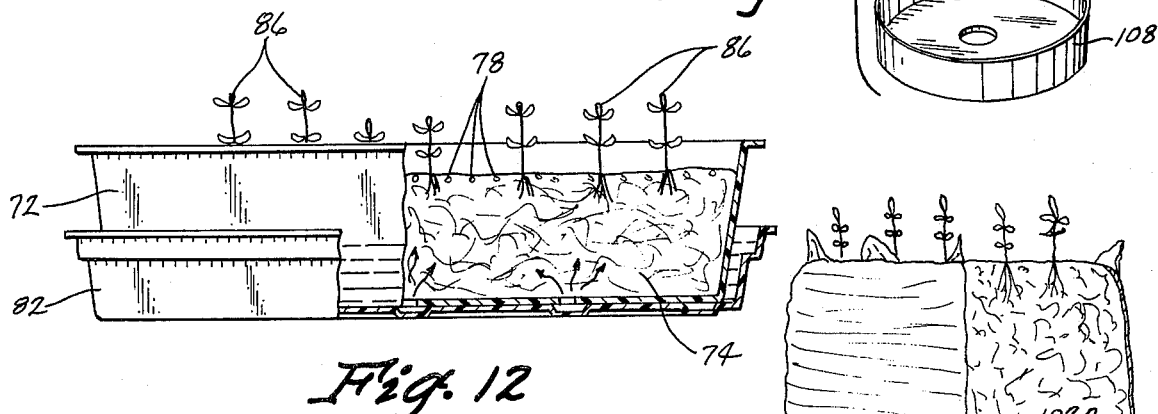
Fig. 12
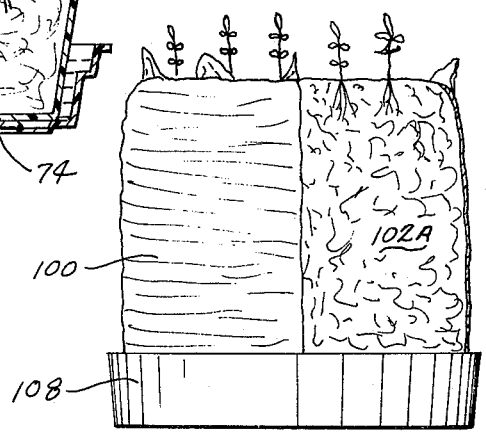
Fig. 13
Fig. 14  Fig. 15

FLOWER POT CONTAINER FOR PLANT SEEDS IN A DORMANT GROWING MEDIUM AND METHOD OF PREPARING FOR STORAGE AND SHIPMENT AND THEN USING SAME

BACKGROUND OF THE INVENTION

This application is a continuation-in-part application of my co-pending application, Ser. No. 503,803, filed Sept. 6, 1974, Potted Plant And Shipping Container And Method Of Preparing Same For Shipping. The earlier application covers the concept of using a wire grid over the granular soil and applying wax onto the grid. The wax may be either left on the soil permanently or chipped away.

SUMMARY OF THE INVENTION

The present application contemplates the use of water soluble wax which may be dissolved and washed away by application of water from a faucet or the like. The wax is heated and applied in liquid form to compressed peat moss to secure plant seeds to the top of the peat moss even when the container for the product is inverted as during shipment. The container may be sufficiently large to allow expansion of the peat moss prior to use when water is applied or the container may be comprised of telescopically interconnected nesting sections which expand in response to the expanding peat moss at the time of the application of water to the peat moss. Water also dissolves the wax and washes it away leaving the seeds to germinate in the moist peat moss environment. Use of the compressed peat moss allows for space in the top of the container for displaying and holding edible foods such as candy and cheeses. The dome of a terrarium-type container particularly emphasizes the attractiveness of this arrangement. The edible food may be placed in a watering tray which prior to use is placed under the container for bottom watering of the plant.

Another embodiment contemplates use of a seed tape in lieu of the soluble wax as the carrier for the seeds and the tape is secured in a suitable manner such as with adhesive to the top of the compressed peat moss. Further, in lieu of the telescopically interconnected nesting sections the container may comprise a skin enclosure adapted to readily adapt to the changing size of the peat moss. The skin may be of tin foil or other pliable material.

DESCRIPTION OF THE DRAWINGS

FIG. 9 is a fragmentary side elevation view of an alternate embodiment of the invention comprising a terrarium including candy in the watering tray.

FIG. 10 is a view similar to FIG. 9 but showing the watering tray in use for bottom watering and the seeds having grown into plants.

FIG. 11 is a fragmentary view of a further embodiment of this invention showing cheese products placed on the compressed peat moss.

FIG. 12 is a side elevation view similar to FIG. 11 but showing the cheese products removed and the seeds growing as plants.

FIG. 13 is an exploded view of a further embodiment of this invention showing the collapsible container being tin foil and the seeds being provided in a seed tape.

FIG. 14 illustrates the components of FIG. 13 in their assembled condition.

FIG. 15 is a view similar to FIG. 14 but illustrating the plant after the peat moss has expanded and the seeds have grown into a plant.

DESCRIPTION OF THE PREFERRED EMBODIMENT

Figure 1:
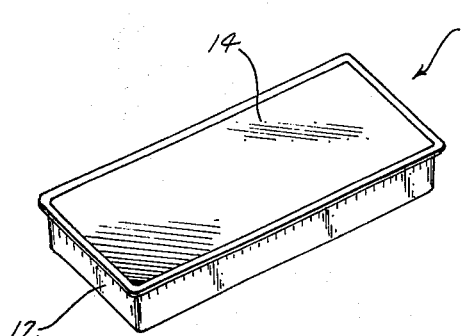
FIG. 1 is a perspective view of the collapsed container containing compressed peat moss.
Figure 2:
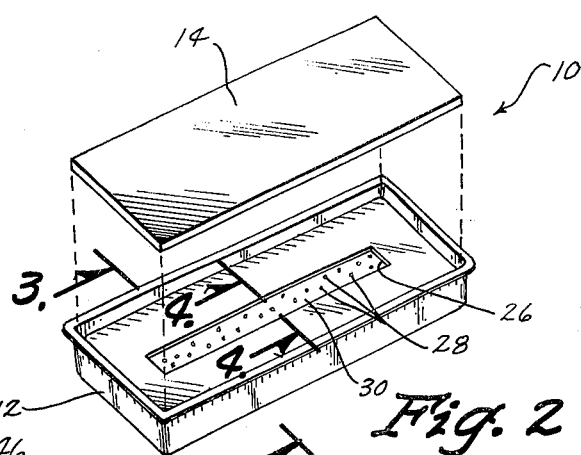
FIG. 2 is an exploded view similar to FIG. 1 but showing the shipping cover removed.
Figure 3:
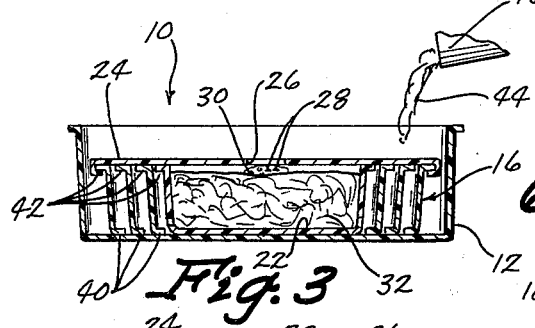
FIG. 3 is a cross sectional view taken along line 3 — 3 in FIG. 2.
Figure 4:
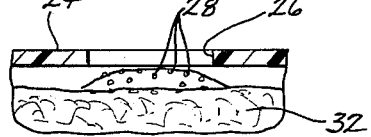
FIG. 4 is an enlarged fragmentary view taken along line 4 — 4 in FIG. 2.
Figure 5:
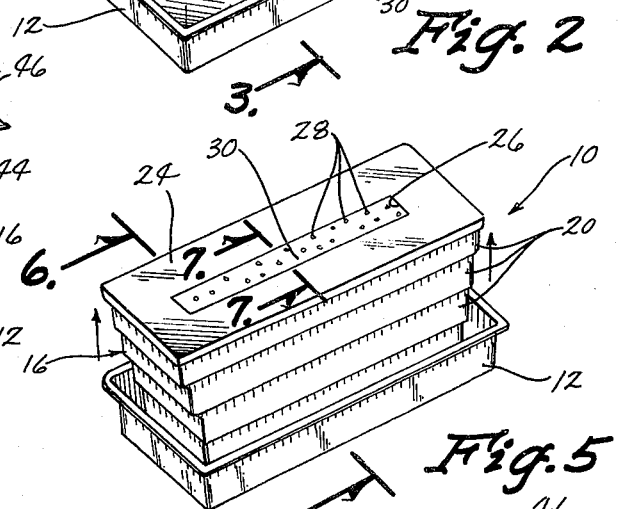
FIG. 5 is a perspective view showing the container in its expanded condition.

The flower box of FIGS. 1 – 8 is referred to generally in FIG. 1 by the reference numeral 10 and includes a container 12 rectangular in shape open at the top except for a removable shipping cover 14. A variable size container 16 is positioned in the box 12 and includes a plurality of telescopically interconnected nesting sections 20 with the bottom section having a bottom wall 22. The top section is substantially closed by a cover 24 having an elongated opening 26 along the longitudinal center line of the container 16 for exposing seeds 28 embedded in a layer of water soluble wax 30 on top of compressed peat moss 32. It is seen in FIG. 3 that the compressed peat moss 32 occupies in the collapsible container 16 only a portion of the total space available in the container 16 when compared with the expanded size of the container.

Each of the telescopic sections 20 include bottom peripheral inwardly extending flanges 40 for engagement with outwardly extending peripheral flanges 42 on the upper end of the next lower section 20.

Figure 8:
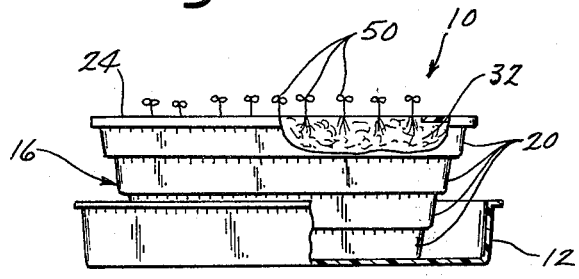
FIG. 8 is a fragmentary view of the container showing plants that have grown from the seeds.
Figure 6:
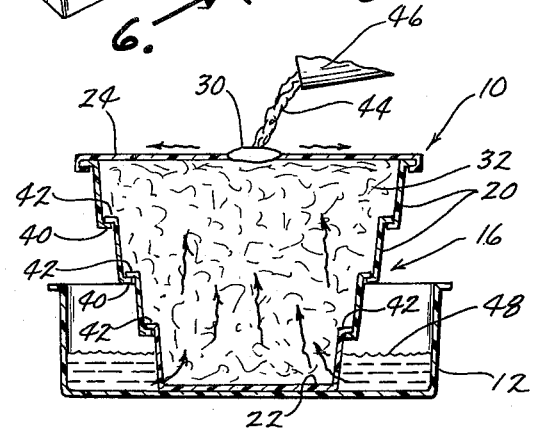
FIG. 6 is a cross sectional view taken along line 6 — 6 in FIG. 5 and showing water being applied to the peat moss and soluble wax containing the seeds.
Figure 7:
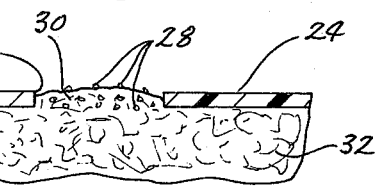
FIG. 7 is a cross sectional view taken along line 7 — 7 in FIG. 6.

The flower box 10 is assembled by first placing the compressed peat moss in the telescopic container 16 and applying seeds 28 to the top of the peat moss followed by a heated coating of water soluble wax 30 for securing the seeds 28 to the peat moss during shipment and the like. The cover 24 is then placed on the top telescopic sections 20 followed by the shipping cover 14. Upon arrival at the destination and in preparation for use the shipping cover 14 is removed and discarded and as seen in FIG. 3, water 44 is applied from a faucet or container 46 to the wax 30 which in turn dissolves it and allows it to wash away leaving the seeds 28 which can now germinate and begin growing in the moistened and expanded peat moss 32. The expansion of the peat moss causes the telescopic section 20 to expand to the condition of FIG. 6. Future watering is accomplished by providing water 48 in the watering tray 12. As seen in FIG. 8 plants 50 are produced by the seeds 28 and extend upwardly through the opening 26 in the cover 24.

It is appreciated that the flower box of this invention involves fascinating, if not magical, qualities that are appreciated by the user when water is applied to the opening 26 in the cover 24. The expandable container 16 begins rising before the user's eye for no apparent reason followed by gradual disappearance of the wax 30 which as indicated leaves the seeds 28. The drama continues days later as the plants 50 begin to appear.

A second embodiment of this invention is shown in FIGS. 9 and 10 and includes a terrarium container 52 having a transparent dome 54 on a base 56.

In preparation for shipment a quantity of compressed peat moss 58 is placed in the bottom of the base container 56 and heated water soluble wax 60 is applied to the top of the peat moss over seeds 62 to secure the seeds in place on the peat moss. A watering tray 64 is placed on the wax 60 and is filled with candy products 66 which are emphasized by the terrarium dome through which the colorful candy can be viewed. Upon arrival at the destination the user will remove the tray 64 of candy 66 and upon consumption of the candy 66 the tray 64 will be placed under the terrarium base 56 and filled with water 68 for bottom watering of the terrarium. The water soluble wax 60 has previously been washed away as previously discussed relative to the embodiment of FIGS. 1 – 8 leaving the seeds 62 to germinate and grow in the now expanded peat moss 58 which substantially fills the base 56 of the terrarium 52 as seen in FIG. 10. Plants 70, in due course, will appear under the dome 54 and will be nourished by the bottom watering from the tray 64. Thus it is seen that what may appear as an attractive container of candy upon initial inspection turns out to be a pleasant surprise when the user discovers that the material in the bottom of the base 56 will expand before his eyes to the condition of FIG. 10 to later provide growing plants 70. Expansion is due to the application of water to the peat moss which also washes away the water soluble wax 60 and begins germination of the plant seeds 62.

A further embodiment of this invention is shown in FIGS. 11 and 12 wherein a rectangular in shape flower box tray 72 is provided which includes compressed peat moss 74 occupying a portion of the tray capacity as seen in FIG. 11 prior to expanding to the condition of FIG. 12 filling substantially the tray 72. As in the other embodiments a layer of soluble wax 76 including the seeds 78 is applied to the top of the compressed peat moss 74. A shipping cover 79 is placed on the layer of wax 76 and in turn packages of cheese 80 are displayed on the shipping cover 79. A plastic bubble enclosure 82 encases the entire assembly including a watering tray 84. The plastic 82 is discarded at the destination by the user who also removes the cheese 80 for his eating enjoyment and throws away the shipping cover 79. This exposes the water soluble wax 76 which is dissolved by application of water thereby leaving the seeds 78 to germinate in the now moist and expanded peat moss 74 as seen in FIG. 12 which produces the growing plants 86. Again it is seen that what appears to be a package of cheese products 80 turns out to be much more since specifically growing plants 86 in the flower box container 72. Growth is maintained by bottom watering from the tray 84.

The water soluble wax may be obtained from the Union Carbide Corporation under the trademark Carbo wax.

The embodiment of FIGS. 13 – 15 illustrates a collapsible and expandable container comprised of a skin enclosure formed from tin foil 100 which may be contracted as seen in FIG. 14 or expanded as seen in FIGS. 13 and 15. The properties of tin foil allow it to take on the shape of the product inside and in this case the peat moss which is compressed in FIG. 14, as indicated at 102, and expanded in FIG. 15 as indicated at 102a. The seeds 104 are provided on a tape which may be secured to the top of the peat moss in its compressed state by adhesive or the like. The tape, upon application of water, dissolves and washes away leaving the seeds to germinate and grow.

A dish 108 holds the product during storage, shipment and when in use. It is further seen that the product is pellet shaped before the peat moss is activated by the application of water.

I claim:
1. A flower pot container and growing medium comprising, a flower pot container including
   a plurality of telescopically interconnected sections and a top wall connected to the uppermost section,
   compressed peat moss filling a portion of the maximum capacity of said container,
   said container having sufficient capacity to hold said compressed peat moss upon it being expanded by the application of water, and
   said container being self adjusting to conform to the size of the peat moss in its compressed and expanded states whereby said peat moss when wetted rising and forcing said top wall upwardly moving said sections from a collapsed to an expanded state.

2. The structure of claim 1 wherein seeds are provided on said peat moss.

3. The structure of claim 2 wherein means is provided for holding said seeds on said peat moss.

4. The structure of claim 3 wherein said means for holding said seeds on said peat moss is further defined as being water soluble wax.

5. The structure of claim 1 wherein said top wall includes an opening to expose said peat moss to the atmosphere.

6. The structure of claim 5 wherein seeds are provided on said peat moss under said opening in said top wall.

7. The structure of claim 1 wherein said plurality of sections are rectangular in cross section.

8. The structure of claim 1 wherein said plurality of sections increase in area from the bottom section to the uppermost section.

9. The structure of claim 1 wherein said peat moss in its compressed condition filling a portion of the maximum capacity of said container being further defined as filling only the lowermost section when in its compressed condition and the other sections each having a height substantially equal to that of the lowermost section.

10. The structure of claim 1 wherein said interconnected sections include pheripheral flanges adapted to interlock upon said sections being moved to said expanded condition.

11. The structure of claim 10 wherein said interconnected sections are interconnected only by said pheripheral flanges adapted to interlock.

12. The structure of claim 1 wherein said pot container is positioned in a watering tray and said bottom section is provided with openings to provide communication between said watering tray and said bottom section.

* * * * *